United States Patent

[11] 3,569,989

[72] Inventor John David Millward
Orpington, England
[21] Appl. No. 692,037
[22] Filed Dec. 20, 1967
[45] Patented Mar. 9, 1971
[73] Assignee The Rank Organisation Limited
London, England
[32] Priority Dec. 20, 1966
[33] Great Britain
[31] 570,27

[54] AFTERGLOW CORRECTING CIRCUIT ARRANGEMENTS
9 Claims, 1 Drawing Fig.

[52] U.S. Cl. .......... 178/7.2, 378/127, 178/7.5, 178/6
[51] Int. Cl. .......... H04n 5/14
[50] Field of Search .......... 178/7.2(D), 7.2, 7.5 (E), 6 (B) (WB); 328/142, 143, 167; 325/65; 250/217 (GRT); 333/19; 315/10 (X); 178/7.1 (AC); 328/127; 235/183

[56] References Cited
UNITED STATES PATENTS

| | | | |
|---|---|---|---|
| 2,851,522 | 9/1958 | Hollywood | 178/6 (BWR) |
| 2,986,704 | 5/1961 | Lichtenstein | 328/142 |
| 3,002,048 | 9/1961 | Bailey et al. | 178/7.2(D) |
| 3,008,001 | 11/1961 | Reith | 178/7.2(D) |
| 3,436,473 | 4/1969 | McMann | 250/217(CRT) |

*Primary Examiner*—Richard Murray
*Assistant Examiner*—Richard P. Lange
*Attorney*—Griffin, Branigan & Kindness

ABSTRACT: An afterglow correction circuit is provided for use in television film scanning apparatus to reduce in the video output signal from the apparatus that component resulting from the optical decay energized phosphor in the scanning tube and producing an afterglow in this tube. The correction circuit includes plural differentiating circuits connected in parallel with each other and with a signal level equalizing impedance between a low output impedance amplifier and a low input impedance amplifier. The time constants of the differentiating circuits, in combination, match the complex time constant of the afterglow component in the video signal.

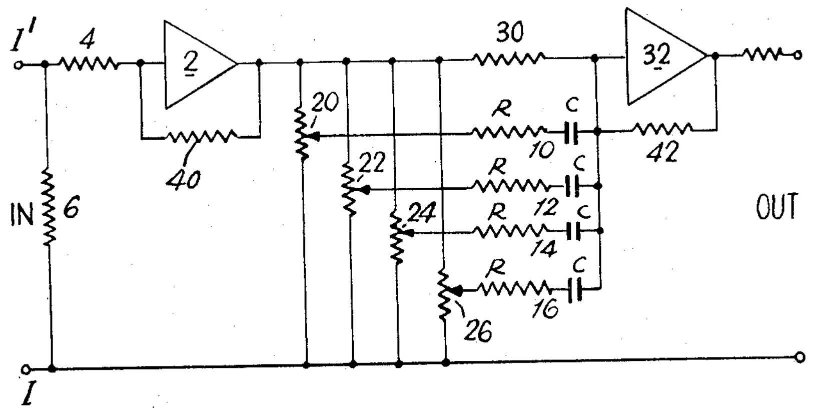
I'
4
2
30
32
20
R
C
10
42
40
22
R
C
IN
6
24
R
12
C
14
OUT
R
C
26
16
I

AFTERGLOW CORRECTING CIRCUIT ARRANGEMENTS

This invention relates to afterglow correcting circuit arrangements effective particularly in television film scanning apparatus to reduce in the video output signal from the apparatus that component resulting from the optical decay of the energized phosphor in the scanning tube which produces an afterflow in this tube.

In such apparatus a special cathode ray tube is used to scan the film by way of an optical system. In use a light beam produced from the scanned spot on the tube screen is passed through the film and after modulation by the information stored on the film is subsequently directed to be incident upon the sensitive area of the photocell from which the television video signal is produced for transmission after suitable processing.

The cathode ray tube used in such apparatus is characterized in that the phosphor on the scanning tube screen has an afterglow which is extremely short compared with that of normal phosphors. At present no phosphor has yet been produced with a suitably wide spectrum of light output to produce effective scanning and with a sufficiently low level of afterglow. Accordingly, even with the best phosphors available, the television signal produced by such apparatus is virtually useless unless that component of the output signal resulting from the optical decay of the phosphor producing the afterglow is eliminated as far as possible.

In one method of afterflow correction, the video output signal from the photoelectric cell is combined before being passed for processing, with a plurality of compensating signals, each of which is a differential of a signal derived from the photocell output and which, when combined with this output signal are effective to eliminate therefrom that decayed component produced by afterflow in the scanner tube phosphor.

Compensating signals are produced in series connected resistance capacitance differentiating circuits of known kind.

Since the decay characteristics of the scanner tube phosphor are not truly exponential each of the differentiating circuits is usually arranged to have a different time constant so that the combination of the outputs of these differentiating circuits produces as close an approximation as possible to the decay characteristics of the afterglow component in the video signal so as to produce most effective compensation of this component. However, since the afterglow characteristics do not remain constant over even a relatively short time period, the time constant of the differentiating circuits usually need to be both initially and continuously adjusted in order both to achieve and to maintain substantially complete afterglow correction.

In hitherto used afterglow correcting circuits the time constant changes are effected by altering the values of the resistive element in the differentiating circuits. However, since such resistance changes in one circuit produces interaction changes in the cooperating circuits, and such known circuits are most difficult to adjust in the first instance and subsequently also most difficult to maintain in an optimum adjusted position. In addition, impedance variations of such circuits produce considerable mismatch in the input and output terminations of the correcting circuit as a whole and thus produces distortion of the video waveform being processed as well as other electrical disadvantages hereinafter recited.

According to the present invention there is provided an electric circuit arrangement for effecting afterglow correction in the video signal produced in television film scanning apparatus comprising first signal translation means having an input connectable to receive the uncorrected video signal and having an output of substantially zero impedance, a plurality of differentiating circuits connected to receive in parallel an output from the first signal translation means, second signal translation means having an input of substantially zero impedance connected to receive a combination of the outputs from the differentiating circuits and a signal derived from the uncorrected signal, and means for separately adjusting the level of the first signal translation means output that is applied to each of the differentiating circuits to achieve desired reduction of the afterglow component.

The provision of first and second signal translation means with very low output and input impedance, respectively, ensures minimum interaction between the differentiating circuits as a result of adjustment of the signal therein, or otherwise, even where the differentiating circuits share a common pickoff element connected across the second signal translating means.

Suitably the first and second signal translation means are amplifiers, the input of the first amplifier and the output of the second amplifier being matched to the characteristic impedances of their cooperating circuits. For most commonly used circuits these impedances would be 75 ohms.

Preferably the differentiating circuits are arranged in parallel with one another and suitably in parallel with a signal level equalizing impedance connected between the output and the input respectively of the first and second amplifiers signal translating means.

Conveniently the differentiating circuits are resistance capacitance circuits having differentiating time constants, the combination of which is effective to match the complex time constant of the afterglow component of the video signal whereby to effect substantially complete elimination of the afterglow component from the video signal. The substantially complete afterglow correction may be obtained during operation by adjusting the relative levels of the inputs to these circuits, e.g., by means of potentiometers. The differentiating circuits are preferably arranged to provide different degrees, ranging from coarse to fine correction control by suitable chöice and adjustment of their parameters.

Preferably, each of the differentiating circuits has an additional resistive element for limiting the amplitude of signals therethrough. Then, where potentiometers are used for signal adjustment, their resistance values may be low compared with those of the additional resistive elements so that adjustment of each potentiometer has a substantially linear effect.

An embodiment of the invention will now be particularly described by way of example with reference to the accompanying drawing which is a schematic circuit diagram of an afterglow correcting circuit arrangement according to the present invention.

Referring to the drawing the circuit arrangement comprises a first amplifier 2 having its input indirectly connected by way of a source impedance 4 and a shunt impedance 6 to the output of the photoelectric cell (not shown), of television film scanning apparatus and receiving the video signal derive from this cell. The combination of the resistors 4 and 6 ensures that the input impedance of amplifier 2 is about 75 ohms and is thus matched to the characteristic impedance of the coordinating circuits connected to input terminals I and I'.

The output of amplifier 2 which is of any suitable type well known in the art, is arranged to have a substantially zero output impedance and to apply its output signal to a plurality, conveniently 4 or more, differentiating circuits indicated generally at 10 to 16.

Each of the differentiating circuits 10 to 16 comprises a common pickoff resistor 42 and a capacitor C connected in series with an amplitude limiting resistor R and is arranged to receive the signal from amplifier 2 by way of potentiometers 20 to 26. The impedance of the potentiometers 20 to 26 are arranged to be low relative to the resistors R connected in the cooperating differentiating circuits 10 to 16 so that variations in the impedances of these potentiometers, which are effective to equalize the levels of the signals applied to the cooperating differentiating circuits, give a substantially linear response as well as producing very little interaction upon one another and upon the amplifier 2.

The outputs of the differentiating circuits 10 to 12 are combined with an output from amplifier 2 derived by way of a signal level equalizing resistor 30 so that the combined input to amplifier 32 is effective substantially completely to remove from the video signal entering amplifier 2 that unwanted component resulting from afterglow in the scanning tube of the apparatus. The time constants of each of the differentiating circuits 10 to 12 are arranged such that the combination thereof is adequate to compensate for the nonexponential afterglow delay characteristics, any changes in these characteristics over a period of time being affected by consequential adjustments in potentiometers 20 to 26.

The input impedance of amplifier 32 which again is of any suitable type well known in the art, is again arranged to be substantially zero so that any variation in the resistance of potentiometers 20 to 26 produces no interaction and allows for easy adjustment.

The output of amplifier 32 which is arranged to have a 75-ohms impedance, passes the afterglow corrected video signal for further processing.

The circuit arrangement described can be remoted for any distance since the input and output impedances respectively of the amplifiers 2 and 32 can be made accurately to match their cooperating circuits over a wide band of frequencies. The circuit is also able to reduce drift due to the large amount of feedback employed by way of resistors 40 and 42 so that AC coupling errors are avoided.

The use of the potentiometers of low source impedance ensures virtually no interaction between the controls The invention also allows further differentiating circuits to be added for finer degrees of afterglow correction control without the disadvantage of interaction.

I claim:

1. An electric circuit arrangement for effecting afterglow correction in the vidoe signal produced in television film scanning apparatus comprising:
   a. first signal translation means having an input connectible to receive the uncorrected video signal and having an output of substantially zero impedance;
   b. a plurality of differentiating circuits connected to receive in parallel an output from the first signal translation means; and
   c. second signal translation means having an input of substantially zero impedance connected to receive a combination of the outputs from the differentiating circuits and a signal derived from the uncorrected signal; and
   d. means for separately adjusting the level of the first signal translation means output that is applied to each of the differentiating circuits to achieve desired reduction of the afterglow component.

2. A circuit arrangement as claimed in I calim 3, wherein the first and second signal translation means are amplifiers.

3. A circuit arrangement as claimed in claim 1, wherein the input and the output respectively of the first and second signal translation means are matched to the characteristic impedances of circuits with which they are to operate.

4. A circuit arrangement as claimed in claim 1, wherein a signal level equalizing impedance is connected between the first and second sigan signal translation means in parallel relationship with the differentiating circuits to supply said uncorrected signal.

5. A circuit arrangement as claimed in claim 1, wherein the differentiating circuits are resistance capacitance circuits.

6. A circuit arrangement as claimed in claim 8, wherein the means for separately adjusting include potentiometers each for varying the signal in a different one of the differentiating circuits.

7. A circuit arrangement as claimed in claim 4, whereing the differentiating circuits have distinct capacitive elements and share a common resistive element connected across the second signal translation means.

8. A circuit arrangement as claimed in claim 1, comprising a plurality of resistive elements each connected in a different one of the differentiating circuits to establish a maximum amplitude for signals in each differentiating circuit.

9. A circuit arrangement as claimed in claim 6, whereing wherein the values of the resistances of the potentiometers are low compared with the values of the corresponding resistive elements of said plurality so that adjustment of each potentiometer has a substantially linear response.